United States Patent [19]

Nakagawa

[11] 4,048,658
[45] Sept. 13, 1977

[54] VIDEO RECORDING AND REPRODUCING SYSTEM USING HADAMARD MATRIXING

[75] Inventor: Shiro Nakagawa, Tokyo, Japan

[73] Assignee: TDK Electronics Co., Ltd., Tokyo, Japan

[21] Appl. No.: 541,663

[22] Filed: Jan. 16, 1975

[30] Foreign Application Priority Data

| Jan. 22, 1974 | Japan | 49-9834 |
| Mar. 7, 1974 | Japan | 49-25675 |
| Apr. 17, 1974 | Japan | 49-42257 |
| Apr. 17, 1974 | Japan | 49-43717 |
| Aug. 21, 1974 | Japan | 49-96301 |
| Aug. 21, 1974 | Japan | 49-96302 |

[51] Int. Cl.² .............................................. H04N 5/79
[52] U.S. Cl. .......................................... 360/9; 360/22; 360/32
[58] Field of Search ................. 360/9, 26, 27, 22, 23, 360/32, 33; 179/15 BC; 178/DIG. 3, 6; 325/38 R, 41, 42; 358/133, 138

[56] References Cited

U.S. PATENT DOCUMENTS

| 2,892,886 | 6/1959 | Johnson | 360/23 |
| 2,958,735 | 11/1960 | Maler | 360/23 |
| 3,082,293 | 3/1963 | Johnson et al. | 360/23 |
| 3,553,080 | 1/1971 | Hammond | 360/23 |
| 3,792,355 | 2/1974 | Miyata et al. | 179/15 BC |
| 3,806,640 | 4/1974 | Furukawa | 360/23 |
| 3,921,209 | 11/1975 | Yoshino et al. | 360/32 |
| 3,937,944 | 2/1976 | Radzyner | 324/42 |
| 3,975,764 | 8/1976 | Kabayashi et al. | 360/23 |

OTHER PUBLICATIONS

Hadamard Transferm Image Coding, Pratt et al., Proceedings of the IEEE, vol. 57, No. 1, Jan. 1969, pp. 58-68.

Primary Examiner—Raymond F. Cardillo, Jr.
Attorney, Agent, or Firm—Burgess, Ryan and Wayne

[57] ABSTRACT

A video recording system with a plurality of fixed recording-and/or-playing-back magnetic heads has been disclosed. A video signal with a wide frequency band is converted using an Hadamard conversion circuit, to a plurality of narrow band signals. Each narrow band signal is recorded and played back by each fixed head. The Hadamard conversion circuit is very simple in structure and can be provided with digital switching circuits and adders or integrators.

2 Claims, 22 Drawing Figures

VIDEO RECORDING AND REPRODUCING SYSTEM USING HADAMARD MATRIXING

BACKGROUND OF THE INVENTION

The present invention relates generally to a video recording system, and, in particular, relates to a fixed magnetic head type video recording system.

It has been well known that a video signal, such as a television signal, has a wide frequency of band up to 4 MHz, but a present fixed type magnetic head can only record and/or play-back 2 $\mu$ of wave length, which corresponds to 500 KHz in 1 m/sec of type speed. Accordingly a special technique is necessary for recording the wide band (4 MHz) of a video signal with the narrow band (500 KHz) of a magnetic head.

A prior art designed for that purpose required that a wide video band be divided into a plurality of narrow sub-bands through a plurality of band pass filters, each narrow sub-band is converted to a basic frequency band through heterodyne conversion, and each basic band is recorded by the respective corresponding fixed magnetic head. However, that prior art has a disadvantage in that many filters and a complex circuit are necessary for dividing the wide frequency band for the heterodyne conversion.

The other prior art requires that a single helical scan type magnetic head records and/or plays back a video signal. In a helical scan type magnetic head, the moving speed of a tape is substantially very high, therefore, a single magnetic head can record and/or play back a wide band of video signal. However, a helical scan type recording system has a disadvantage in that the mechanism required for rotating the magnetic head is complex.

SUMMARY OF THE INVENTION

It is an object, therefore, of the present invention to overcome the disadvantages and limitations of prior video recording systems by providing a new and improved video recording system.

It is also an object of the present invention to provide a new improved method for recording and/or playing back a video signal.

The above and other objects are attained by a video recording system having at least an Hadamard matrix circuit for converting a single channel of a wide-band signal to a plurality of channels of narrow sub-bands, and a plurality of magnetic heads corresponding to each sub-channel.

BRIEF DESCRIPTION OF THE DRAWINGS

The foregoing and other objects, features, and attendant advantages of the present invention will be appreciated as the same become better understood in conjunction with the accompanying drawings wherein.

DETAILED DESCRIPTION OF THE PREFERRED EMBODIMENTS

Figure 1:
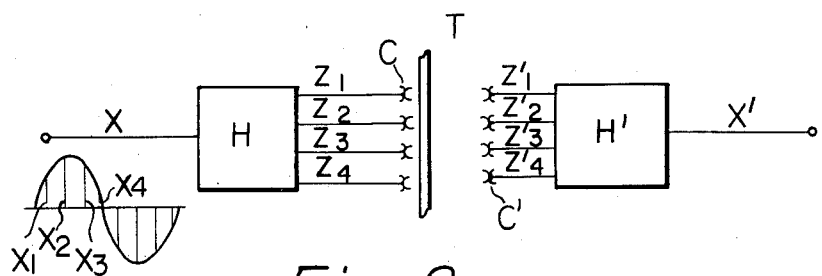
FIG. 1 is a brief block diagram of a video recording and/or playing back system according to the present invention.

FIG. 1 is a block-diagram of a video recording and/or playing back system according to the present invention, in which H shows a Hadamard matrix circuit, H' shows an inverse Hadamard matrix circuit, X is an input video signal, $Z_1$ through $Z_4$ are input sub-channel signals, $Z_1'$ through $Z_4'$ are output sub-channel signals, X' is an output video signal, C is a fixed magnetic head, and T is a magnetic tape. An input video signal X which is in analog form is, at first, sampled for every predetermined period and converted to a PAM (Pulse Amplitude Modulation), and each sampled value, for instance $x_1, x_2, x_3, x_4$, is converted to sub-channel signals $z_1, z_2, z_3, z_4$, by the Hadamard matrix circuit H.

A Hadamard matrix is an orthogonal $n \times n$ matrix whose elements are the real numbers +1 and −1. An orthogonal matrix is a matrix whose rows are orthogonal $n$-tuples. The 2 × 2 Hadamard matrix $H_2$, 4 × 4 Hadamard matrix $H_4$, and 8 × 8 Hadamard matrix $H_8$ are shown below.

$$H_2 = \begin{bmatrix} 1 & 1 \\ 1 & -1 \end{bmatrix}$$

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

The existence of Hadamard matrices $Hm$ has been proved for the following values of $m$, where $p$ denotes an odd prime integer:

I. $m = 2^k$

II. $m = p^k + 1$, if this is a multiple of 4.

III. $m = m_1(p^k + 1)$, where $m_1 \geq 2$ is the order of a Hadamard matrix.

IV. $m = m^*(m^* - 1)$, where $m^*$ is a product of numbers of forms I and II.

V. $m = 172$.

VI. $m = m^*(m^* + 3)$, where $m^*$ and $m^* + 4$ are products of numbers of forms I and II.

VII. $m = m_1 m_2 (p^k - 1)p^k$, where $m_1 \geq 2$, $m_2 \geq 2$ are orders of Hadamard matrices.

VIII. $m = m_1 m_2 s(s + 3)$, where $m_1 \geq 2$, $m_2 \geq 2$ are orders of Hadamard matrices and where $s$ and $s + 4$ are both of the form $p^k + 1$. IX. $m = (q + 1)^2$, where both $q$ and $q + 2$ are prime or prime powers.

X. $m$ is a product of numbers of the form I to IX.

This list is taken from a paper by Bose and Shrikhanoe, ("A note on a Result in the Theory of Code Construction" Inf. and Control, Vol. 2, No. 2, pp. 183–194 June (1959)Academic Press, N.Y., N.Y.), which gives further details also on the binary codes. These methods enable construction of Hadamard matrices of order m for all values of m that are less than 200 and divisible by 4 except 116, 156, and 188. However, the existence of a Hadamard matrix has not been disproved for any m which is a multiple of 4.

The actual conversion in the Hadamard matrix circuit H is as follows in case of 4 × 4 matrix.

$$\begin{bmatrix} Z_1 \\ Z_2 \\ Z_3 \\ Z_4 \end{bmatrix} = \frac{1}{2} \cdot \begin{bmatrix} 1 & 1 & 1 & 1 \\ 1 & 1 & -1 & -1 \\ 1 & -1 & -1 & 1 \\ 1 & -1 & 1 & -1 \end{bmatrix} \cdot \begin{bmatrix} x_1 \\ x_2 \\ x_3 \\ x_4 \end{bmatrix}$$

Accordingly $Z_1 = \frac{1}{2}(x_1 + x_2 + x_3 + x_4)$ $Z_2 = \frac{1}{2}(x_1 + x_2 - x_3 - x_4)$ $Z_3 = \frac{1}{2}(x_1 - x_2 - x_3 + x_4)$ $Z_4 = \frac{1}{2}(x_1 - x_2 + x_3 - x_4)$ It should be appreciated that the band width of each subchannel signal $Z_1$ through $Z_4$ is only one fourth of that of the original input signal, because a signal $Z_i$ appears only once in every four of the signals $x_1$, $x_2$, $x_3$, $x_4$. Each sub-channel signal $Z_1$ through $Z_4$ is recorded on a tape T through each fixed magnetic head i.e. $C_1$, respectively. In the playing back cycle, a plurality of magnetic heads C' reads each sub-channel signal $Z_1'$ through $Z_4'$, which are converted inversely to the video signal X' by the inverse Hadamard matrix circuit H'. As is generally known, a recording head C can, of course, double as a playing back head C'. The values of $Z_1'$ through $Z_4'$ are of course the same as those of $Z_1$ through $Z_4$, respectively.

Since the inverse Hadamard matrix H' is mathematically the same as the original Hadamard matrix, the output video signal X' ($x_1'$, $x_2'$, $x_3'$, $x_4'$) is;

$$\begin{bmatrix} x_1' \\ x_2' \\ x_3' \\ x_4' \end{bmatrix} = \frac{1}{2} \cdot \begin{bmatrix} 1 & 1 & 1 & 1 \\ 1 & 1 & -1 & -1 \\ 1 & -1 & -1 & 1 \\ 1 & -1 & 1 & -1 \end{bmatrix} \cdot \begin{bmatrix} Z_1' \\ Z_2' \\ Z_3' \\ Z_4' \end{bmatrix}$$

Accordingly $X_1' = \frac{1}{2}(Z_1' + Z_2' + Z_3' + Z_4')$ $X_2' = \frac{1}{2}(Z_1' + Z_2' - Z_3' + Z_4')$ $X_3' = \frac{1}{2}(Z_1' - Z_2' - Z_3' + Z_4')$ $X_4' = \frac{1}{2}(Z_1' - Z_2' + Z_3' - Z_4')$ Thus it is apparent that $x_1' = x_1$, $x_2' = x_2$, $x_3' = x_3$ and $x_4' = x_4$, and that the original video signal is regenerated.

Since each sub-channel signal $Z_1$ through $Z_4$, and $Z_1'$ through $Z_4'$ have a narrow frequency band, a fixed magnetic head can be utilized for each sub-channel signal, instead of a prior helical scan magnetic head. Further, it should be noted that, some sub-channel signals such as $Z_3$ and/or $Z_4$, could be omitted without causing much deterioration in picture quality, and in that case, two or three sub-channels only are sufficient for recording the video signal converted through a (4 × 4) Hadamard matrix.

Figure 2:
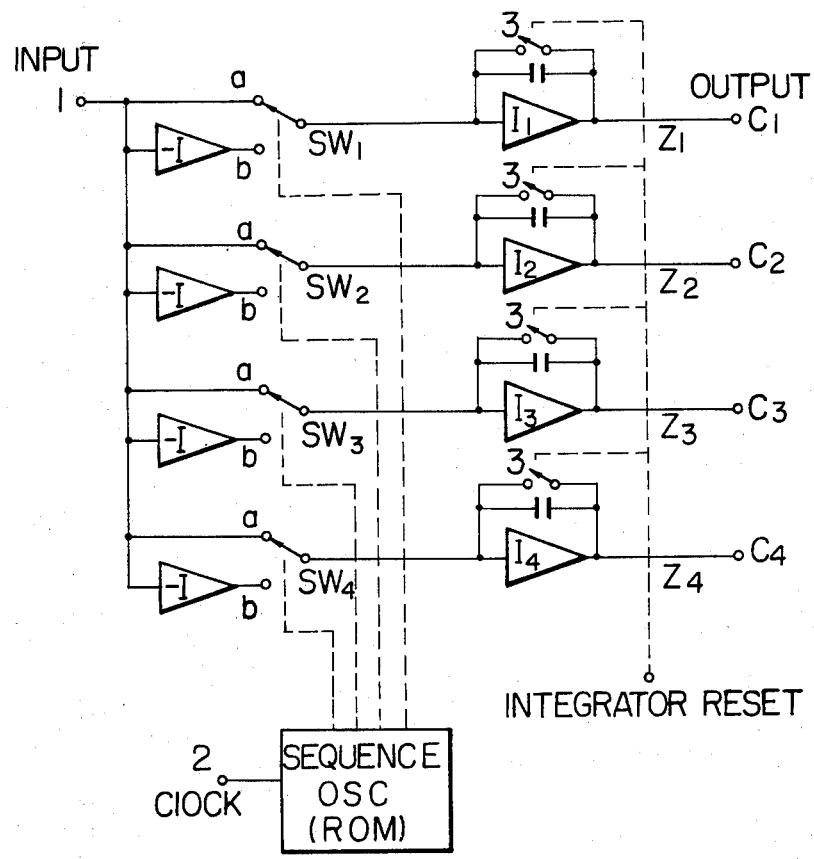
FIG. 2 is an embodiment of a Hadamard matrix circuit according to the present invention.

FIG. 2 is an embodiment of a Hadamard matrix circuit according to the present invention, in which a television signal 1 from conventional video amplifier means is sampled as a sequential signal x, which can be expressed as $$x = (x_1, x_2, \ldots, x_n)^t$$

A sequence oscillator, consisting of a read-only memory ROM and a clock generator 2, generates the pulse train according to the value of each row of the Hadamard matrix which operates analog switches $SW_1$ to $SW_4$ and integrators $I_1$ to $I_4$ so as to convert the aforesaid sequential signal x into the following parallel sequence components Z.

$$H = \begin{bmatrix} h_{11} & \cdots & h_{1n} \\ \vdots & & \vdots \\ h_{n1} & \cdots & h_{nn} \end{bmatrix} \quad h_{ij} = 1 \text{ or } 0$$

$$Z = (Z_1, Z_2, \ldots, Z_n)^t$$

The sequence components Z are parallel output signals, as far as time is concerned, more particularly, the aforesaid sequential signal x is converted by the Hadamard conversion pulse matrix H into the parallel signals Z, which are applied to input terminals $C_1$ to $C_4$ of a plurality of magnetic heads. The element $Z_1$ of the output Z after the H conversion represents a coefficient of the $1 - 1$ order sequence, and has characteristics similar to that of the frequency components of the original signal.

In the figure, the symbols $I_i$ represent integrators, while the reference numerals 3 represent reset switches for the integrators. In FIG. 2, four parallel signals are obtained from the input sequential signal. Based on the same principles, the sequential input signal can be easily divided and converted into any number of parallel signals for the corresponding number of channels, without using special filters, in the aforesaid frequency-divisional approach.

In FIG. 2, the sequence oscillator controls the operation of the switches $SW_1$ through $SW_4$. As far as the sub-channel $Z_1$ is concerned, the switch $SW_1$ is always connected to the contact (a), since $Z_1$ is expressed $$Z_1 = \tfrac{1}{4}(x_1 + x_2 + x_3 + x_4).$$

Each value $x_1$, $x_2$, $x_3$ and $x_4$, is applied to the integrator $I_i$ in turn, and the integrator $I_i$ integrates all the input signals $x_1$, $x_2$, $x_3$ and $x_4$ thus, an output signal whose amplitude is proportional to $(x_1 + x_2 + x_3 + x_4)$ is obtained from the integrator $I_i$. As for the sub-channel $Z_2$, the switch $SW_2$ is connected to the contact $(a)$ at times $t_1$ and $t_2$, while it is connected to the contact $(b)$ at times $t_3$ and $t_4$, since $Z_2$ is expressed $$Z_2 = \tfrac{1}{4}(x_1 + x_2 - x_3 - x_4).$$

That is to say, the polarity of $x_3$ and $x_4$ is inverted by the inverter $(-I)$. Each value $x_1$, $x_2$, $-x_3$, and $-x_4$ is applied to the integrator $I_2$ in turn, and the integrator $I_2$ integrates all the input signals $x_1$, $x_2$, $-x_3$, $-x_4$, thus, the output signal whose amplitude is proportional to $(x_1 + x_2 - x_3 - x_4)$ is obtained from the integrator $I_2$. Similarly, the switches $SW_3$ and $SW_4$ are controlled according to the third row and the fourth row of the Hadamard matrix, respectively, and the integrators $I_3$ and $I_4$ provide output signals proportional to $(x_1 - x_2 - x_3 + x_4)$ and $(x_1 - x_2 + x_3 - x_4)$, respectively. The control sequence of the switches $SW_1 - SW_4$ is stored in the read-only memory of the sequence oscillator according to the elements of the Hadamard matrix.

Now, the second embodiment of the Hadamard matrix circuit according to the present invention will be explained with respect to FIGS. 3, 4 and 5.

Figure 3:
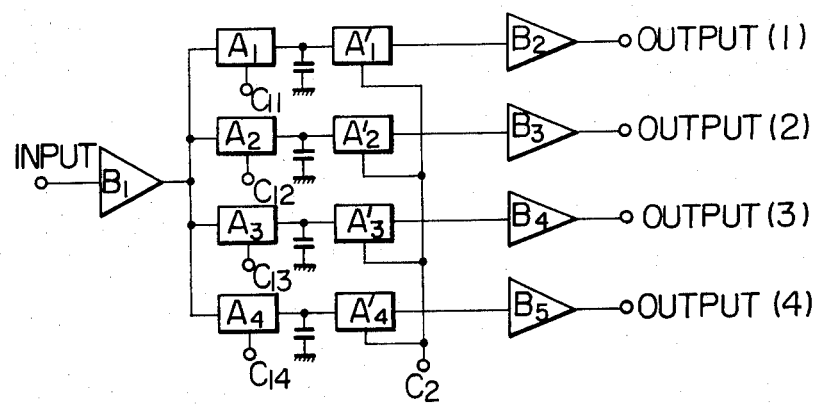
FIG. 3 is an embodiment of a serial-parallel conversion circuit according to the present invention.
Figure 4:
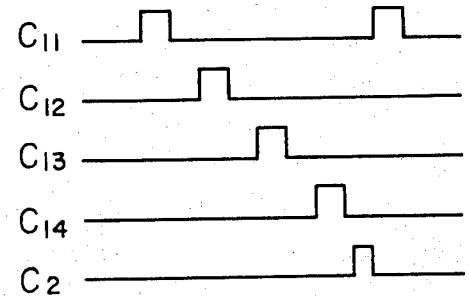
FIG. 4 is a waveform of control signals for the circuit in FIG. 3.

FIG. 3 illustrates an exaple of the serial-parallel conversion circuit to be used in the present embodiment. A television signal is applied to a buffere amplifier $B_1$, whose output is applied to analog switches $A_1$ through $A_4$. A series of control pulses $C_{11}$, $C_{12}$, $C_{13}$, and $C_{14}$, as illustrated in FIG. 4, are successively applied to the aforesaid analog switches, so as to successively hold the input signal in the respective capacitors. Another control signal $C_2$, as shown in FIG. 4, is simultaneously applied to other analog switches $A_1'$ through $A_4'$, for reading the voltage on the capacitors, and the parallel signal is obtained at the outputs of the analog switches $A_1'$ through $A_4'$.

The parallel signals thus produced by conversion are amplified by buffer amplifiers $B_2$ through $B_5$, respectively. The signals at the output terminals of the buffer amplifiers, i.e., Output (1) through Output (4), are transmitted to input terminals Input (1) through Input (4) of a Hadamard converter circuit, as shown in FIG. 5 (A) or FIG. 5 (B).

Figure 5:
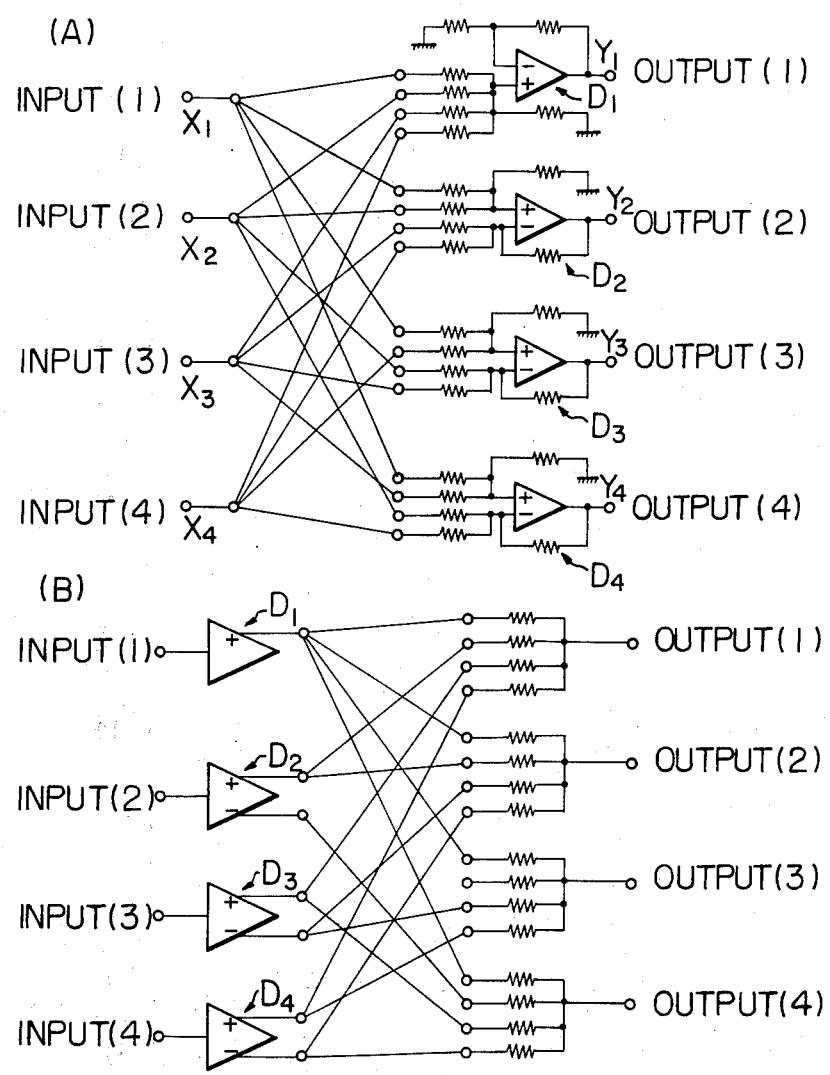
FIG. 5 (A) and FIG. 5 (B) are other embodiments of a Hadamard matrix circuit according to the present invention.

FIG. 5 (A) is a wiring diagram of a 4 × 4 Hadamard converter using a plurality of adders, which applies Hadamard conversion to the parallel signals transmitted to the terminals Input (1) through Input (4), respectively. For instance the input signals $x_1$, $x_2$, $x_3$, and $x_4$ are treated by the Hadamard converter, and output sequence components, i.e., four channel parallel signals $y_1$, $y_2$, $y_3$, ad $y_4$ are four channel parallel signals $y_1$, $y_2$, $y_3$, and $y_4$, are produced at the output terminals Output (1) through Output (4) of the parallel adders $D_1$ through $D_4$, respectively, which output sequence components are given by $$y_1 = x_1 + x_2 + x_3 + x_4 \quad y_2 = x_1 + x_2 - x_3 - x_4$$

$$y_3 = x_1 - x_1 - x_2 - x_3 + x_4 \quad y_4 = x_1 - x_2 + x_3 - x_4$$

The four channel video signals are recorded by a conventional channel recorder, which includes four or fewer magnetic heads.

It is one of the features of the embodiment of FIG. 5(A) that a plurality of adders $D_1$ through $D_4$ is utilized for the addition and/or subtraction required in the Hadamard conversion, instead of a plurality of integrators $I_1$ through $I_4$ in the embodiment of FIG. 2.

FIG. 5(B) is a modification of FIG. 5(A). The differences of FIG. 5(A) and FIG. 5(B) are that, in FIG. 5(B), bi-polar signals are obtained from the serial-parallel converter, and therefore the adders $D_1$- $D_4$ have only to perform addition, but substraction is not performed. An arithmetic amplifier in an adder is shown in FIG. 5(B) for the sake of simplicity.

Next, the third embodiment of the present invention will be explained below with respect to FIGS. 6, 7 and 8. The third embodiment concerns the improvement of the fiedlity of the video signal. Generally speaking, a video signal recorded on a magnetic tape and played back from the same suffers from some waveform distortion. Therefore, a special feature is requested for overcoming the waveform distortion in a video recorder.

Figure 6:
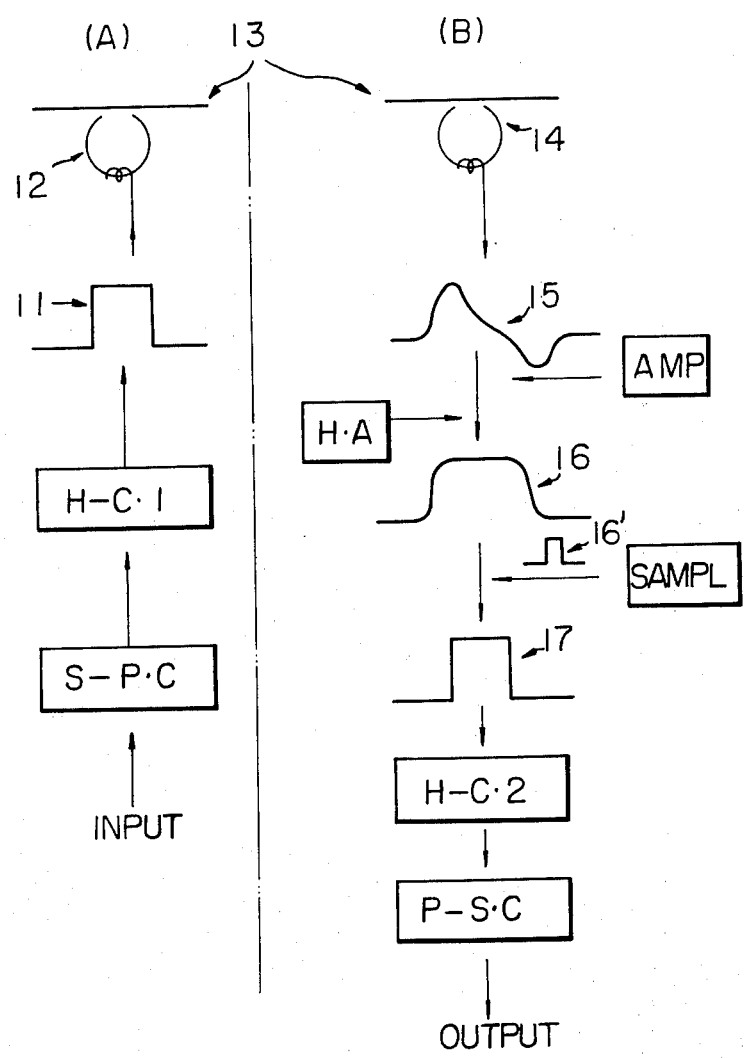
FIG. 6 (A) and 6 (B) show another embodiment of a video recording and/or playing back system according to the present invention.

FIG. 6 is a block diagram, which illustrates the manner in which a television signal is recorded on a magnetic tape after being divided into a plurality of channels through a Hadamard conversion circuit, and the recorded television signal is reproduced.

Video signals 11, as divided into a plurality of channels by a Hadamard conversion circuit H-C 1, are recorded on a magnetic tape 13 by the same number of magnetic heads 12 as the number of the channels. At the time of reproduction, the same number of reproducing heads 14 as the number of the channels produces read signals 15 from the magnetic tape 13. The read signals 15, which are distorted by the physical properties of the magnetic tape 13 and the heads 14 and the like, are delivered to conventional amplifiers and equalizers, as designated by the symbol AMP, for restoration of the original waveform, and then fed to a head alignment correction circuit H·A, so as to make corrections for phase deviations among different channels of the magnetic tape 13.

Video signals 16, as treated by the aforesaid conventional waveform restoration and wave shaping, are still distorted, because the elimination of the wave distortion by the conventional treatments is insufficient. At this stage, if those video signals 16 are sampled at suitable points thereof by sampling pulses 16' prepared by using synchronizing signals inserted to each channel and if the specific sampled values are halted until the time of next sampling, it will become possible to form perfect rectangular waves 17.

The perfect rectangular waves 17 thus formed in the divided channels are converted into sequential signal by an inverse Hadamard conversion circuit H-C·2.

When the output signals from the inverse Hadamard circuit H-C·2 are reconverted into a sequential signal by a parallel-series conversion circuit P-S·C, the picture carried by the sequential video signal can be shown on a regular television receiver set.

Figure 7:
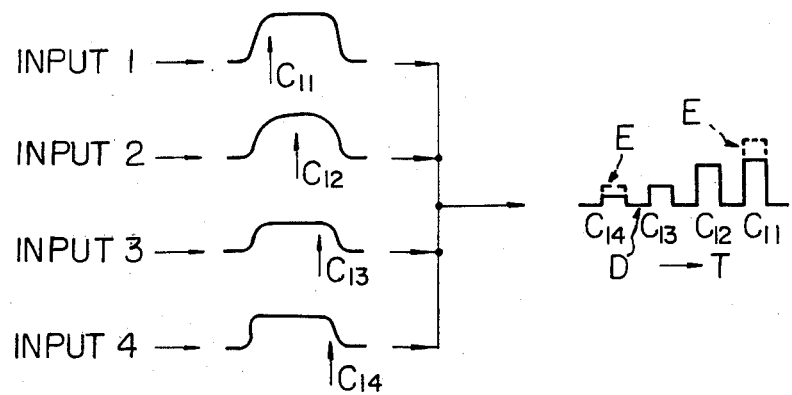
FIG. 7 shows waveform of a video signal when a sample hold circuit is not utilized.

FIG. 7 illustrates the waveform of signals through the parallel-series conversion circuit for the case in which the parallel video signals are not acted upon by sample signals from a sample-hold circuit. In this case, if sequential control pulses $C_{11}$ through $C_{14}$ act on almost all of the central portions of the parallel video signals, as shown by $C_{12}$ and $C_{13}$, no distortion will be caused. However, if the sequential control pulses act on the edge portions of the parallel video signals, as shown by $C_{11}$ and $C_{14}$, distortions will be caused, so that the sequential signal D involves distortion E which causes deterioration in the quality of the picture.

Figure 8:
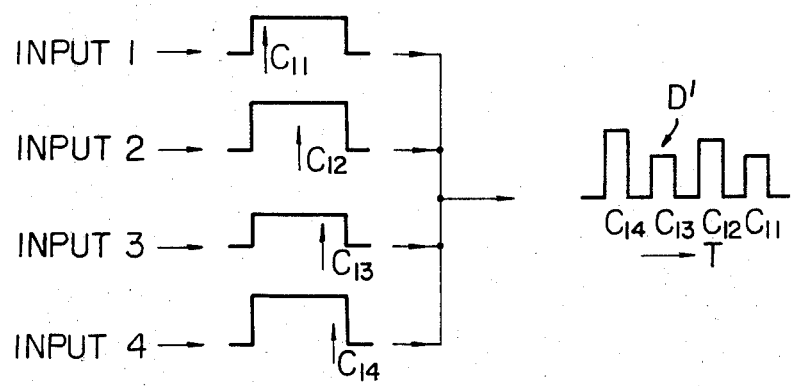
FIG. 8 shows waveforms of a video signal when a sample hold circuit is utilized.

FIG. 8 illustrates the case in which the parallel video signals are acted on by sample signals 16' from the sample-hold circuit SAMPL and then delivered to the parallel-series conversion circuit P-S·C. In this case, the sequential signal D' does not include any harmful distortions at all.

As is apparent from the foregoing disclosure, outstanding effect can be achieved by the video signal reproducing device according to the present invention, because distortions in the video signals as reproduced by the same number of reproducing heads as the number of channels can be eliminated, after conventional waveform restoration and wave shaping, by using sample pulses from a sample-hold circuit.

Now, the fourth embodiment of the present invention will be explained with respect to FIGS. 9 through 12. This embodiment also concerns the improvement of fidelity by reducing the phase differences due to the straight alignment of a plurality of magnetic heads. In reproducing the signal from the magnetic tape by reproducing heads whose number corresponds to the number of the channels, if the slit gaps of the reproducing heads are not accurately aligned on a proper straight line, a phase deviation among output signals from the reproducing heads will be caused, which leads to considerable distortion in the reproduced original signal made by a synthesis of the signals from the reproducing heads.

Especially, in the case of high density recording and reproducing, such as recording and reproducing of video signals, if the wave length of the recorded signal is 1 micron, a deviation in the head gaps relative to their proper alignment by 0.5 micron will cause a large signal phase deviation, i.e., 180°. From practical standpoint of dealing with video signals, such signal phase deviations should be reduced to zero. If a signal phase deviation of 9° is allowed, physical deviation of the head gaps should be as small as about 0.025 micron, which is much smaller than that mechanically guaranteeable and cannot be ensured in practice.

Figure 9:
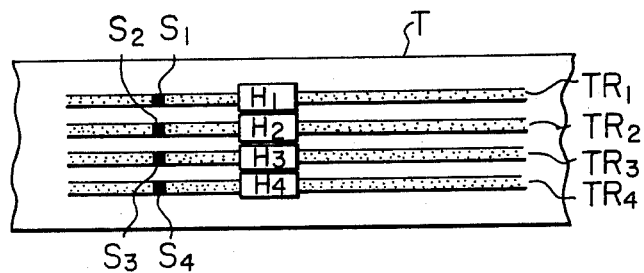
FIG. 9 is a magnetic tape which shows that a control signal is recorded on the same together with a video signal.

FIG. 9, an original signal is divided into four channels, and the divided channel signals, e.g., signals provided by a Hadamard converter, are recorded on a magnetic tape T. With the present invention, control signals, e.g., signals $S_1$ through $S_4$, are inserted or recorded by recording heads $H_1$ through $H_4$.

In the case of video signals, horizontal synchronizing signals per se can be inserted as the control signals. Alternately, specific control signals may be superposed on the horizontal synchronizing signals.

At the time of reproduction, the output from each of the channel reproducing heads $H_1'$ through $H_4'$ (FIG. 10) is fed to a suitable variable delay circuit, such as voltage-responsive variable delay circuits $VD_1$ through $VD_4$, so as to provide reproduced output signals.

A part of the reproduced output signals is applied to a suitable phase discriminator circuit PD, which generates output voltages $e_1$ through $e_4$ corresponding to the integral of phase deviations of the control signals inserted in the different channels. The output voltages $e_1$ through $e_4$ from the phase discriminator circuit PD are fed back to the variable delay circuit $VD_1$ through $VD_4$.

In this case, one of the channels should be used as the reference for facilitating the detection of phase deviation. Any one of the plurality of channels can be selected as the reference channel.

Thus, the variable delay circuits $VD_1$ through $VD_4$ automatically adjust the delay time to be applied to the reproduced output signals, so that the phase deviation among the reproduced output signals $O_1$ through $O_4$ is reduced to zero. Thus, the practicability of such magnetic recording-reproducing device can be ensured.

Figure 10:
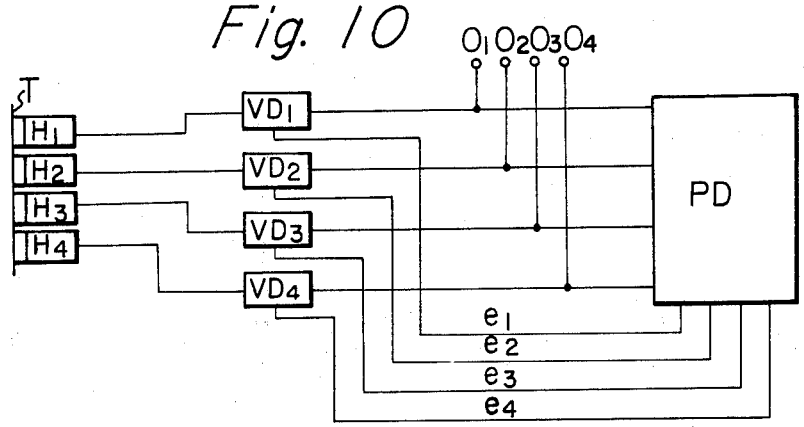
FIG. 10 is another embodiment of a video recording and/or playing back system according to the present invention.

The output signals $O_1$ through $O_4$ are applied to the inverse Hadamard circuit (not shown in FIG. 10).

Figure 11:
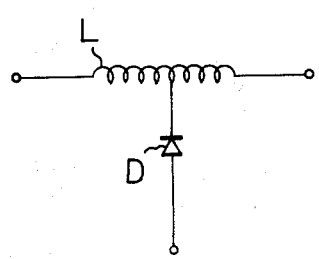
FIG. 11 and FIG. 12 show two embodiments of delay circuits for the circuit in FIG. 10.

As for the variable delay circuits $VD_1$ through $VD_4$, the so-called LC delay elements can be used. FIG. 11 illustrates an example of such a variable delay element, which consists of a variable-capacitance diode D and an inductance L. A voltage applied to the diode D can control the delay time of the variable delay element.

Figure 12:
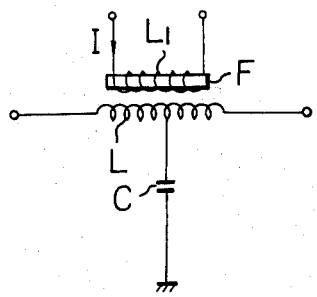

FIG. 12 shows another example of the variable delay circuit, which is a current-responsive type. In this example, an inductance element L connected to a capacitance element C is magnetically coupled to a ferrite core F having a coil $L_1$ wound thereabout. An electric current I from the aforesaid phase discriminator circuit PD is supplied to the coil $L_1$, so as to regulate the permeability of the ferrite core F, whereby the effective inductance of the inductance element L is varied for regulating the delay time of the delay circuit. Further, the delay circuit can be embodied by BBD (Backet Brigade Device) or CCD (Charge Coupled Device).

As is apparent from the foregoing disclosure, an outstanding effect can be achieved in that phase deviation among reproduced signals of different channels, due to misalignment of recording heads and that is reproducing heads, is automatically corrected so as to reduce such phase deviation to zero, whereby problem related to the positional deviation of the head gaps beyond practical accuracy are completely removed by electric means. Such an arrangement is also advantageous from the standpoint of the interchangeability of the magnetic tape.

It should be noted that the arrangement according to the present invention can effectively correct the positional deviation of head gaps which corresponds to ten times the minimum wave length of the signal being recorded, so that if the wave length of the signal being recorded is 1 micron, the positional deviation of head gaps of up to ±5 microns can be corrected by the arrangement.

Next, the structure of a magnetic head which can be utilized in the present invention, in particular, can be utilized for providing a still picture in a video recording and/or playing back system will be explained. The first embodiment of the present magnetic head will be described with regard to FIGS. 13 - 15.

Figure 13A:
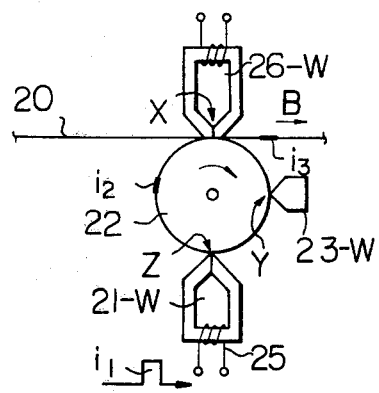
FIG. 13 (A) and FIG. 13 (B) show plan views of a magnetic head according to the present invention.
Figure 13B:
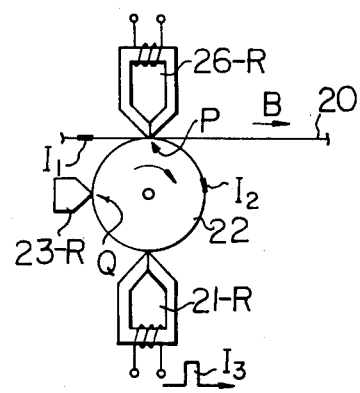

FIG. 13 (a) is a schematic plan view of the recording side of a magnetic head, and FIG. 13(b) is a schematic plan view of the reproducing side of the head. In the figures, the reference numeral 20 represents a magnetic medium, e.g., a video tape, which provides or stores information, and the reference numeral 21-W represents a recording magnetic head for writing or recording the information in the magnetic medium 20, while the reference numeral 21-R represents a reproducing magnetic head to which the recorded information is provided from the magnitude medium 20. As is well known to those skilled in the art, with conventional magnetic recorders, the magnetic heads 21-W and 21-R are brought into direct contact with the magnetic medium 20 for exchanging the information. On the other hand, with the device according to the present invention, the exchange of the information is carried out through a magnetic drum 22 which is disposed between the magnetic head and the magnetic tape.

Figure 14:
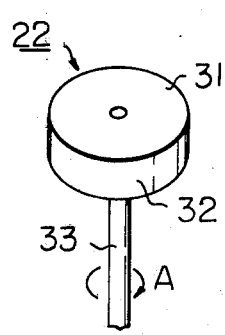
FIG. 14 shows the structure of a drum of a magnetic head of FIG. 13 (A) and/or FIG. 13 (B)

FIG. 14 is a schematic perspective view of the magnetic drum 22. In the figure, the rotary magnetic drum 22 has a cylindrical body 31 made of electric insulating material and non-magnetic material. The peripheral side surface 32 of the body 31 is provided with a magnetic film. A shaft 33 is coaxially connected to the body 31, so that the body 31 can be rotated in the direction of the arrow A (or in the reverse direction) by a driving means (not shown), which shaft 33 also supports the drum 22.

When information $i_1$ (see FIG. 13 (a)) is applied to the recording head 21-W at a time $t_1$, the information is also magneticaly copied onto the magnetic film on the side surface of the rotary magnetic drum 22, and it is moved, at a time $t_2(t_2>t_1)$, to a position $i_2$ (see FIG. 13(a)) and magnetically copied on the magnetic drum 20 at a position X, which magnetic medium is moving in the direction as shown by the arrow B. The information copied on the magnetic medium moves to a position $i_3$ (see FIG. 13 (a)) at a time $t_3(t_3>t_2)$. The information on the magnetic film of the rotary magnetic drum 22 is erased at a position Y (see FIG. 13(a)) by an erasing head 23-W, so as to facilitate the recording of new information on the magnetic drum 22 by the recording head 21-W at the position Z.

Figure 15:
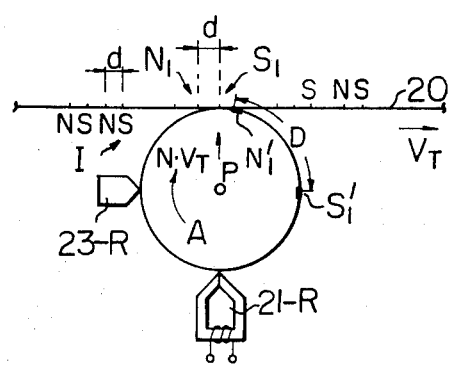
FIG. 15 is a explanatory view of the operation of the magnetic head of FIG. 13 (A) and/or FIG. 13 (B)

In reproduction, an information $I_1$, which is carried by the magnetic medium 20 moving in the direction as shown by the arrow B at a time $T_1$, is magnetically copied onto the magnetic film on the side surface of the rotary magnetic drum 22 at a position P (see FIG. 13 (b)), and the information is moved to a position $I_2$ at a time $T_2(T_2>T_1)$ and reproduced at a time $T_3(T_3>T_2)$ as an information $I_3$ by the reproducing head 21-R. The information on the rotary magnetic drum 22 of the reproducing side is erased at a position Q (see FIG. 13 (b)) by an erasing head 23-R, so as to facilitate the recording of new information by the rotary magnetic drum 22 from the magnetic medium 20 at the position P. Now the operation of the magnetic head in FIGS. 13 (a) and 13(b) is explained with reference to FIG. 15. For the sake of simplicity, only the reproducing operation will be explained. In the figure, it is assumed that information I is recorded on the magnetic medium 20 at a density in excess of a limit which allows reproduction by the reproducing head 21-R and that the information I is moving at a linear speed $V_T$. When one element $S_1$ of the information I arrives at the point P where it comes in contact with the rotary magnetic drum 22 (see FIG. 15), the information element $S_1$ is magnetically copied onto the magnetic film of the rotary magnetic drum 22 at the point P. If the rotary magnetic drum 22 has a peripheral speed of $n\cdot V_T)n>1$, when the succeeding information element $N_1$ arrives at the point P for being copied onto the rotary magnetic drum 22, the previously copied information element $S_1$ on the drum 22 is located in the proximity of a position $S_1'$, as shown in FIG. 15. If the location of the drum 22 at which the information element $N_1$ is copied is represented by $N_1'$, the peripheral distance D between the two succeeding information elements $S_1'$ and $N_1$ 40 on the drum 22 is larger than the spacing $d$ between the two succeeding information elements $S_1$ and $N_1$ on the magnetic medium 20.

Thus, the spacing d is expanded into the peripheral distance D, and the expansion ratio therebetween can be determined as follows. The length of the time from the moment of copying the information element $S_1$, which is on the magnetic medium 20 travelling at a linear speed $V_T$, onto the drum 22 at the point P until the moment of similar copying of the information element $N_1$ at the point P is given by $d/V_T$ (second), because the spacing between the two information elements is $d$. On the other hand, the travelling distance of the copied information element $S_1'$ on the drum 22 in the aforesaid time $d/V_T$ (second), i.e., the peripheral distance D between the two successively copied information elements $S_1'$ and $N_1'$, can be determined by the aforesaid peripheral velocity $n\cdot V_T(N;22$ 1) of the drum 22 in the following manner.

$$D = n \times V_T \times (\frac{d}{V_T}) = n d$$

As is apparent from the above equation, the recording density, or the information element spacing $d$, on the magnetic medium 20 is converted into the information distance D ($D=n\cdot d$) on the rotary magnetic drum 22, so that the recording density is reduced by a ratio of $1/n$. Accordingly, if the ratio of the linear speed of the magnetic medium 20 to the peripheral speed of the rotary magnetic drum 22 is selected to be, for instance, at $n=2$, 5, 20, . . . , the recording density of information can be reduced by a ratio of ½, 1/5, 1/20, . . . , respectively. Thus, the conversion of the recording density can be achieved by using a stationary magnetic head, and the principle of such conversion according to the present invention is completely different from that of the known rotary head system.

It should be noted here that, although the recording density is reduced by a ratio of $1/n$, the copied information is reproduced by the reproducing magnetic head at a velocity of $n\cdot V_T$, and hence the reproducing speed of the information is $(1/r)\cdot n\cdot V_T = V_T$ and the frequency of the information I is reproduced with high fidelity. Thus, the frequency of the information remains unchanged by the recording and reproduction.

In a preferred embodiment, the magnetic film on the side surface of the rotary magnetic drum 12 was formed by plating an alloy at a high coercive force ($H_c$) with a thickness of 1,000 (A) to 3,000 (A). In order to ensure a high copying efficiency at the point P (FIG. 15), the coercive force $H_{c(D)}$ of the aforesaid magnetic film of the drum 22 is selected such that it has the following relationship with the coercive force $H_{c(T)}$ of the magnetic medium 20.

$$H_{c(D)} \approx (\tfrac{1}{2}) \cdot H_{c(T)}$$

It was found that, with the aforesaid alloy magnetic film on the rotary magnetic drum 22, a very smooth contact can be obtained at the point P (see FIG. 15) between the magnetic medium 20 and the rotary magnetic drum 22, and the quality of the copying there was found to be excellent, and the durability of the materials there was found to be high. The reasons for such characteristics at the point P seem to lie in the extreme smoothness of the surface of the magnetic film made by the alloy plating and in the high degree of hardness of the film surface. Similar characteristics were found to be present at the points of contact between the rotary magnetic drum 22 and the magnetic heads 21-W, 21-R. It was found that application of an external force to such contacts by elastic members, such as springs, is preferable. The revolving direction of the rotary magnetic drum 22 is not restricted to that as shown by the arrow A of FIG. 15, but the drum 22 can be rotated in the reverse direction for fulfilling the similar conversion of the recording density. With the reverse rotation, however, the relative speed between the magnetic medium 20 and the magnetic drum 22 is almost doubled, so that excessive slipping may be caused at the contact therebetween. Thus, the reverse rotation of the rotary magnetic drum 22 is not desirable. It is also possible to use an endless tape in lieu of the rotary magnetic drum 22. Either the rotary magnetic drum or the endless tape can be used so as to meet the particular conditions of each specific application.

Another embodiment for ensuring the excellent exchange of information, i.e., biasing, will now be described. The need of biasing in th provision of excellent recording has been widely recognized. A bias circuit provides a suitable magnetic field for the contact between a means providing magnetic signals and a means recording the magnetic signals, so as to ensure the linearity of the information being transmitted and to eliminate signal distortions. With the present invention, it is also necessary to apply a suitable bias magnetic field at the point P of FIG. 15 i.e., at the contact between the signal-providing mgnetic medium 20 and the signal:- recording magnetic drum 22. Such a bias magnetic field should be also provided at the points Z and X of FIG. 13(a) where the magnetic recording takes place.

It should be appreciated that a still picture in a video recording system can be provided by using a magnetic head in FIGS. 13 through 15. That is to say, the storagecapacity of the drum 22 is designed for single frame of a picture, and the revolution speed of the drum 22 is designed to be, for instance 60 r.p.m. In that case, although the tape 20 may stop, the picture signal is re-produced from the drum 22, and a still picture is duly obtained. Accordingly, the combination of the Hadamard matrix circuit and the drum type magnetic head in FIGS. 13 - 15 provides a multi-channel type video tape recorder with the capacity of reproducing a still picture. With a conventional reproducing system, the contents of a still picture are changed by the movement of the magnetic medium, but with the device according to the present invention, the desired still picture can be obtained independently of the movement or removal of the magnetic medium 20.

Biasing means, which is necessary for facilitating the copying of the residual magnetism on the surface of the copying drum onto the magnetic recording medium and the reverse copying, will now be described. In general, a suitable bias is necessary for copying residual magnetism with proper linearity of information being copied and without causing distortions in the information. Although a magnetic bias field has been used heretofore, the inventor has found out that an optical bias results in excellent copying.

Figure 16A:
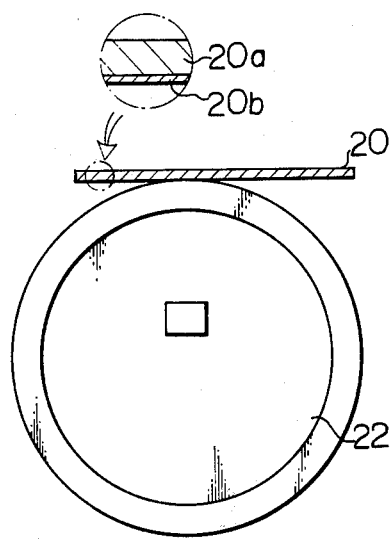
FIG. 16 (A) and FIG. 16 (B) show modifications of the magnetic head of FIG. 13 (A) and/or FIG. 13 (B)
Figure 16B:
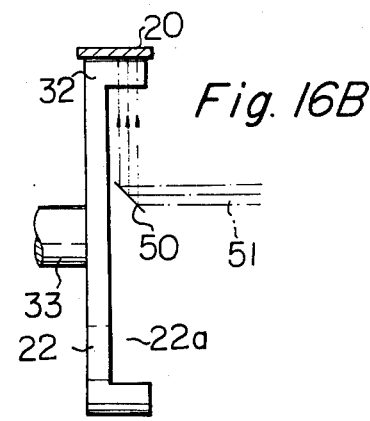

FIG. 16 illustrates a biasing mechanism. A recess 22a is formed at the central portion of the copying drum 22, and a reflective mirror 50 is disposed within the recess (the mirror 50 does not rotate with the copying drum). When a laser beam 51 is projected to the mirror 50, the reflection from the mirror 50 is directed, through the circumferential periphery 32 of the copyingdrum 22, toward the contact portion between the magnetic material layer 20a of the magnetic tape 20 (the magnetic tape 20 includes a magnetic material layer 20a and a non-magnetic substrate 20b) and the magnetic film on the circumferential surface of the copying drum 22, whereby, the reflected laser beam locally heats up the aforesaid contact portion. It was found preferable to heat the magnetic materials at such portion to a temperature in the proximity of their Curie point (the point at which the magnetic material loses its ferromagnetic properties. As is apparent from the foregoing description, the circumferential periphery 32 of the copying drum 22 must be made of transparent or light-transmitting material, such as glass.

Figure 17A:
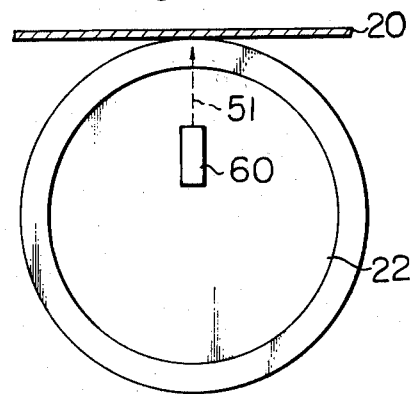
FIG. 17 (A) and FIG. 17 (B) show another modification of the magnetic head of FIG. 13 (A) and/or FIG. 13 (B).
Figure 17B:
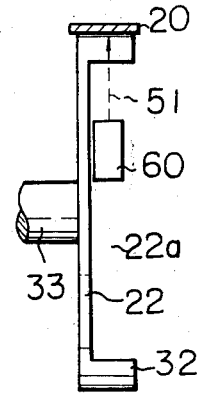

FIG. 17 illustrates another embodiment of the bias mechanism. In this embodiment, a semi-conductor laser unit 60 is disposed within the recess 22a of the copying drum 22, and the laser beam 51 emanating from the laser unit 60 is projected to the magnetic material portions through the circumferential periphery 32 of the copying drum 22, for heating the magnetic material.

The magnetic film on the circumferential periphery of the copying drum 22 can be formed by non-electrolytically plating a suitable magnetic material, such as Co-P, with a thickness of several hundreds A to several thousands A. It was found that such a magnetic film can be effectively heated by the laser beam.

The thermal biasing system with laser beam, according to the present invention, can bias a very small area by using a small laser beam spot, so as to facilitate high density recording and reproducing. When the magnetic film on the circumfernetial surface of the copying drum is very thin, heat diffusion there can be prevented, so as to minimize the apparent spot diameter increase, and such a small diffusion is also advantageous from the standpoint of high density recording and reproducing.

From the foregoing it will now be apparent that a new and improved video recording and/or playing back system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An apparatus for recording and playing back a video signal, comprising means for converting analog serial mode signals to parallel mode signals, means for sampling the amplitude of said parallel mode signals for every predetermined duration for converting said parallel mode signals to a PAM signal, Hadamard matrix means connected to convert said PAM signal to an equivalent signal, recording means having a plurality of fixed magnetic heads for recording the output of said matrix circuit on a magnetic medium, reading means having a plurality of fixed magnetic heads for reading data on said magnetic medium, an inverse Hàdamard matrix circuit connected to convert the output of said second-mentioned magnetic heads to an equivalent parallel PAM signal, means for converting said last-mentioned parallel PAM signal to a serial PAM signal, and means for converting said serial PAM signal to an analog signal, wherein predetermined control signals are inserted in each of the parallel channels at the time of recording the signal, and the output circuit of each of the reproducing heads corresponding to the channels is provided with an electrically controllable variable delay circuit and connected to a phase discriminator circuit, whereby the output voltage signal from said phase discriminator circuit is fed to said electrically controllable variable delay circuit so as to eliminate any difference among control signals in different channels at the time of reproduction.

2. An apparatus for recording and playing back a video signal, comprising means for converting analog serial mode signals to parallel mode signals, means for sampling the amplitude of said parallel mode signals for every predetermined duration for converting said parallel mode signals to a PAM signal, Hadamard matrix means connected to convert said PAM signal to an equivalent signal, recording/means having a plurality of fixed magnetic heads for recording the output of said matrix circuit on a magnetic medium, reading means having a plurality of fixed magnetic heads for reading data on said magnetic medium, an inverse Hadamard matrix circuit connected to convert the output of said second-mentioned magnetic heads to an equivalent parallel PAM signal, means for converting said last-mentioned parallel PAM signal to a serial PAM signal, and means for converting said serial PAM signal to an analog signal, wherein the number of magnetic heads in said plurality of fixed magnetic heads is less than the number of the power of the Hadamard matrix of the Hadamard matrix means.

* * * * *

UNITED STATES PATENT OFFICE
CERTIFICATE OF CORRECTION

Patent No. 4,048,658  Dated September 13, 1977

Inventor(s) Shiro Nakagawa

It is certified that error appears in the above-identified patent and that said Letters Patent are hereby corrected as shown below:

Column 2, line 4: "waveform" should be --waveforms--.

lines 53 and 54 (lines 1 and 2 of table): The information in brackets after " $H_2=$ " should read $$-- \begin{bmatrix} 1 & 1 \\ 1 & -1 \end{bmatrix} --.$$

line 63 (2nd to last line of table) should read
-- 1  1 -1 -1 -1 -1  1  1 --.

Column 3, line 10: "$(p^k = 1)$" should be --$(p^k + 1)$--.

line 18: "hanoe" should be --hande--.

UNITED STATES PATENT OFFICE
CERTIFICATE OF CORRECTION

Patent No. 4,048,658    Dated September 13, 1977

Inventor(s)  Shiro Nakagawa

It is certified that error appears in the above-identified patent and that said Letters Patent are hereby corrected as shown below:

Column 3, line 19:  "Inf. and Control" should be
--Inf. and Control--.

line 20:  "June (1959)" should be --(June, 1959)--.

lines 31-36 (the first table):  The brackets in all three columns should be drawn to encompass all four rows, for example, $$"\begin{matrix}z_1\\ \begin{bmatrix}z_2\\ z_3\\ z_4\end{bmatrix}\end{matrix}" \text{ should be } -- \begin{bmatrix}z_1\\ z_2\\ z_3\\ z_4\end{bmatrix} --.$$

line 40:  "$z_2 = 1/2(x_1 + x_2 - x_3 - x_4)$" should be
-- $z_2 = 1/2(x_1 + x_2 + x_3 - x_4)$ --.

UNITED STATES PATENT OFFICE
CERTIFICATE OF CORRECTION

Patent No. 4,048,658          Dated  September 13, 1977

Inventor(s)  Shiro Nakagawa

It is certified that error appears in the above-identified patent and that said Letters Patent are hereby corrected as shown below:

Column 5, line 31:   "exaple" should be --example--.

line 33:   "buffere" should be --buffer--.

line 59:   "ad" should be --and--.

lines 59-60:   "are four channel parallel signals $y_1$, $y_2$, $y_3$, and $y_4$" should be deleted.

line 65:   There should be a separation between the end of the first equation and the beginning of the second equation, that is, "$x_4 y_2$" should read --$x_4 \quad y_2$--.

line 66:   "$y_3 = x_1 - x_1 - x_2 - x_3 + x_4$" should be --$y_3 = x_1 - x_2 - x_3 + x_4$--;

there should be a separation between the end of the first equation and the beginning of the second equation, that is, "$x_4 y_4$" should read --$x_4 \quad y_4$--.

Column 6, line 13:   After "is" insert --not--.

line 18:   "fiedlity" should be --fidelity--.

line 21:   "requested" should be --required--.

line 54:   After "into" insert --a--.

UNITED STATES PATENT OFFICE
CERTIFICATE OF CORRECTION

Patent No. 4,048,658                Dated September 13, 1977

Inventor(s)  Shiro Nakagawa

It is certified that error appears in the above-identified patent and that said Letters Patent are hereby corrected as shown below:

Column 8, line 10:   After "Hadamard" insert --matrix--.

line 32:   Delete "and that is".

line 34:   "problem" should be --problems--.

Column 9, line 55:   "$V_T)n>1)$" should be -- $V_T(n>1)$ --.

line 63:   "$N_1 40$" should be -- $N_1'$ --.

Column 10, line 13:   "(N;22 1)" should be -- $(n>1)$ --.

line 16 (the equation):   "= n d" should be -- $= n \cdot d$ --.

line 38:   "(1/r)" should be --(1/n)--.

line 66:   After "was" insert --also--.

Column 11, line 14:   "embodiment" should be --element--.

line 16:   "th" should be --the--.

line 25:   "mgnetic" should be --magnetic--;

UNITED STATES PATENT OFFICE
CERTIFICATE OF CORRECTION

Patent No. 4,048,658              Dated September 13, 1977

Inventor(s) Shiro Nakagawa

It is certified that error appears in the above-identified patent and that said Letters Patent are hereby corrected as shown below:

Column 11, line 25: "signal--" should be --signal-- --.

line 32: "storagecapacity" should be --storage capacity--.

line 63: "copyingdrum" should be --copying drum--.

Column 12, line 6: "properties." should be --properties).--.

line 27: "circumfernetial" should be --circumferential--.

Column 13, line 8: "recording/means" should be --recording means--.

Signed and Sealed this

Fifteenth Day of August 1978

[SEAL]

Attest:

RUTH C. MASON
Attesting Officer

DONALD W. BANNER
Commissioner of Patents and Trademarks